G. P. KLINE.
SPACING MACHINE.
APPLICATION FILED MAR. 23, 1921.

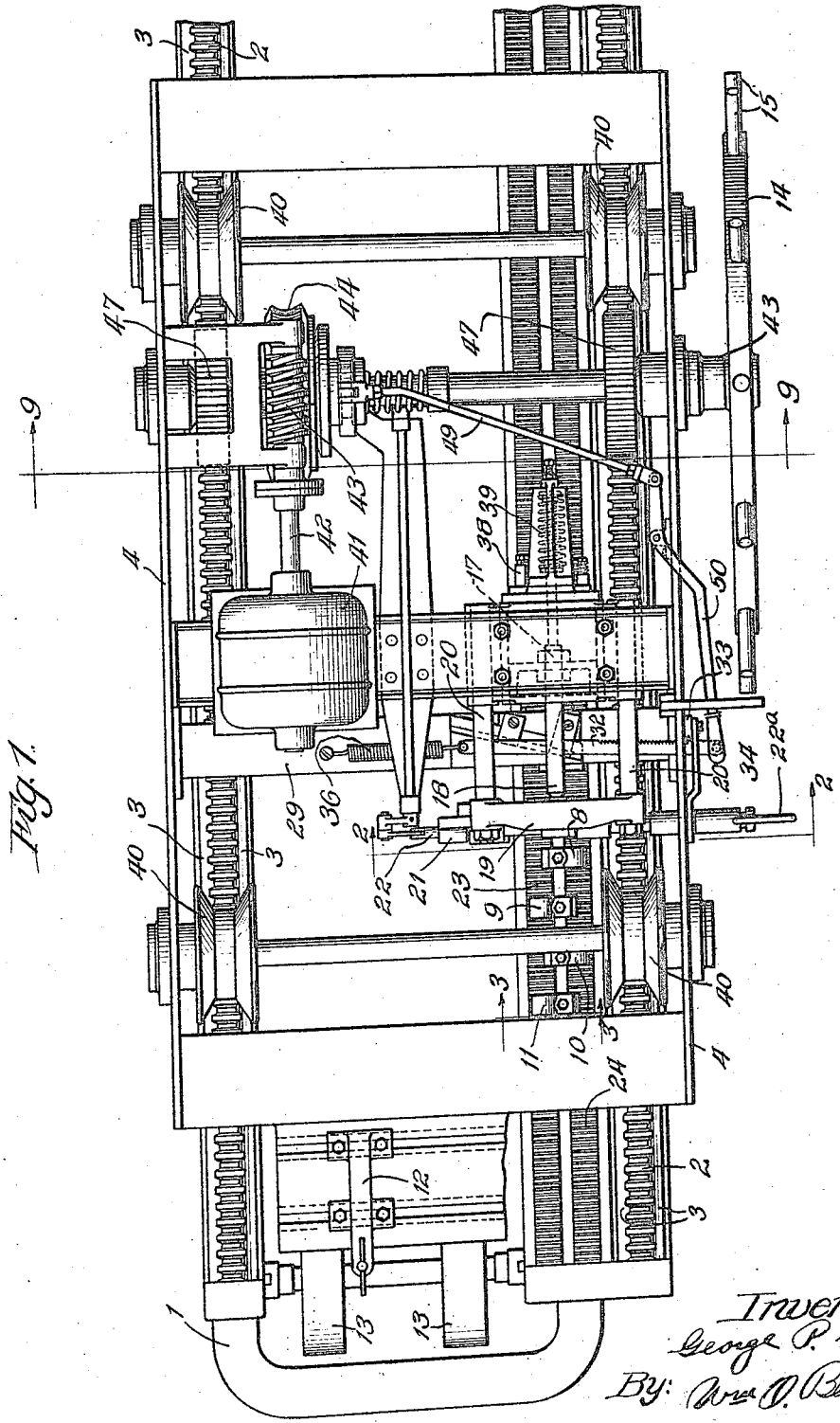

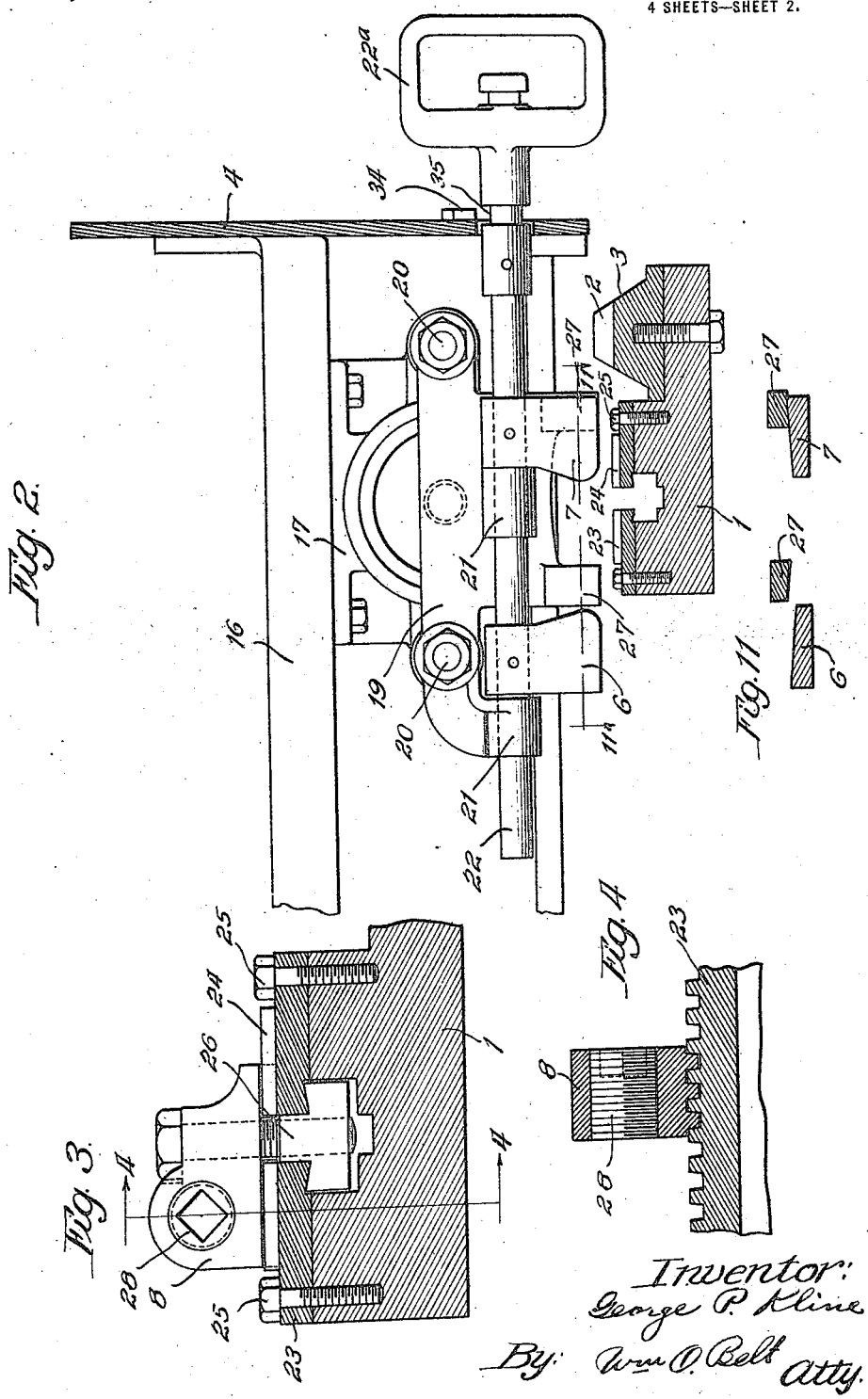

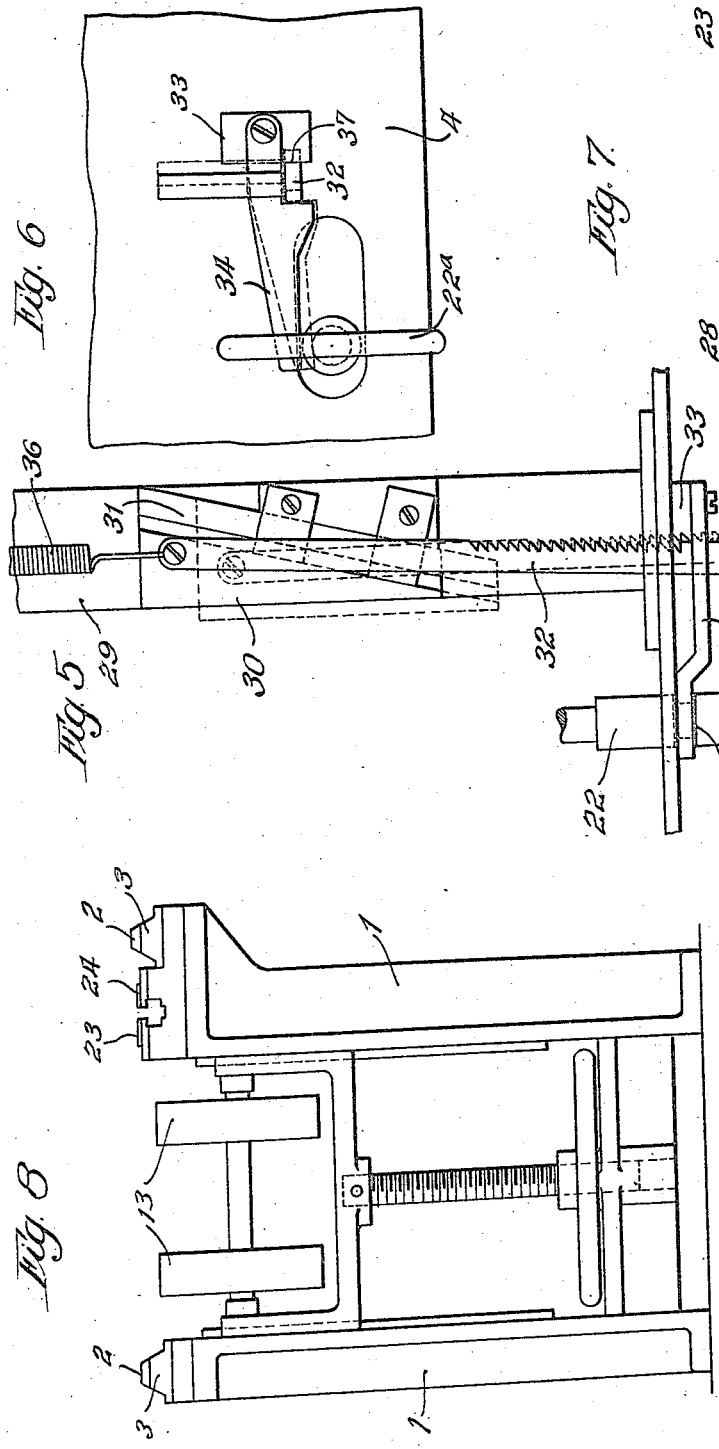

1,416,299.

Patented May 16, 1922.
4 SHEETS—SHEET 4.

Inventor:
George P. Kline,
By Wm. O. Belt Atty.

UNITED STATES PATENT OFFICE.

GEORGE P. KLINE, OF MOLINE, ILLINOIS, ASSIGNOR TO WILLIAMS, WHITE & COMPANY, OF MOLINE, ILLINOIS, A CORPORATION OF ILLINOIS.

SPACING MACHINE.

1,416,299.   Specification of Letters Patent.   Patented May 16, 1922.

Application filed March 23, 1921. Serial No. 454,895.

*To all whom it may concern:*

Be it known that I, GEORGE P. KLINE, a citizen of the United States, residing at Moline, in the county of Rock Island and State of Illinois, have invented certain new and useful Improvements in Spacing Machines, of which the following is a specification.

My invention relates to the fabrication of metal parts and structures and consists in a spacing machine adapted to intermittently advance plates or other stock through a punch press or other machine tool for successive predetermined distances.

In fabricating structural steel, for example, it may be desired to perform a series of operations on a single piece of stock or on a number of pieces of stock according to predetermined spacing and the main object of my invention is to provide a machine which will feed one or more sheets, angles, or other material, to a machine tool, such as a punch press, so as to produce repeated punchings in the stock in predetermined locations. I attain this main object by feeding the stock by means of a carriage which travels along a frame equipped with a plurality of stop elements adapted to successively engage the carriage to halt the latter during each punching operation.

I also desire to provide adequate means for freeing the carriage from each engagement with the machine frame when the carriage and stock are to be advanced.

An additional object of my invention is to secure accuracy in the spacing of the punching by positively maintaining contact of the carriage with the frame stop elements during operation of the machine tool; to eliminate shock when each stop is engaged; to eliminate play between the carriage and the frame and thus avoid errors which might otherwise result in punching the stock; to provide for micrometer-like adjustments for the stop faces and thus produce any fractional spacing of the punchings; and to provide for special punchings when required without interfering with or affecting the stops which produce the normal or set punchings.

Another object of the invention is to provide means whereby the spacing elements may be assembled in their operative relation apart from the machine and then be applied to the machine already set up, whereby non-productive periods usually present in changing from one job to another are avoided.

Further objects of the invention are to provide means for driving the machine manually or by power and particularly to provide an efficient power drive which accommodates the varying driving conditions arising during the operation of the machine; and to provide particular features of construction to enable the various mechanisms to efficiently perform their several functions.

In the accompanying drawings I have shown a selected embodiment of the invention and referring thereto—

Figure 1 is a top view of the machine adapted to be operated by hand or by power:

Figure 2 is a vertical, transverse section taken on line 2—2 of Figure 1;

Figure 3 is a similar section taken on line 3—3 of Figure 1;

Figure 4 is a detail section taken on line 4—4 of Figure 3;

Figure 5 is an enlarged, detail top view of a special stop device;

Figure 6 is a side view of a lock used in connection with the special stop device of Fig. 5;

Figure 7 is a fragmentary top view of the index plates and stop elements;

Figure 8 is an elevation of the left-hand end of the machine;

Figure 11 is a transverse, horizontal, sectional view on line 11—11 of Fig. 2.

Figure 9:
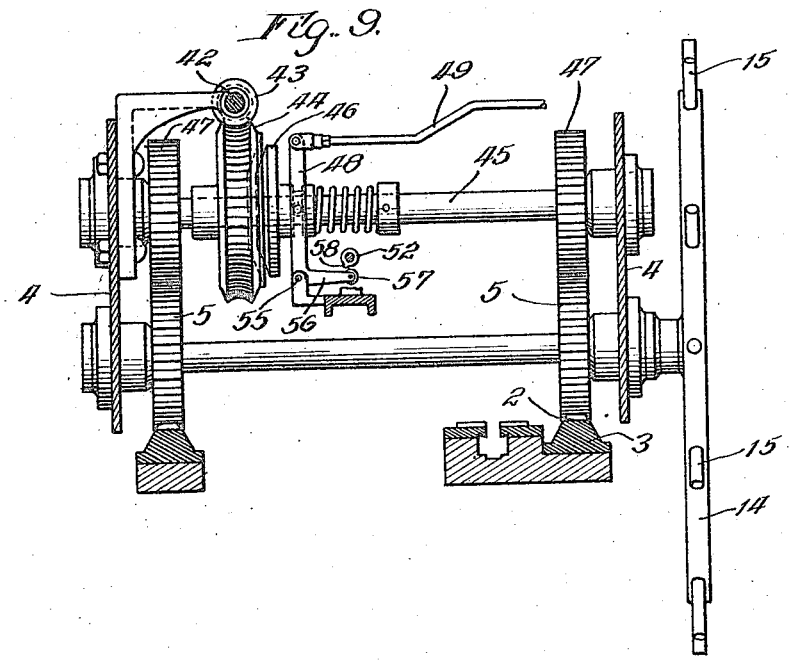
Figure 9 is a vertical transverse section taken on line 9—9 of Fig. 1.
Figure 10:
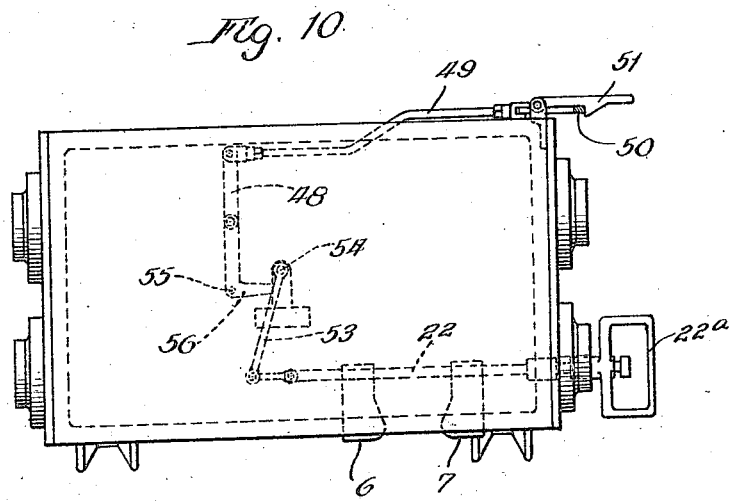
Figure 10 is a view largely diagrammatical, looking in the same direction as Fig. 9 but from a plane nearer the left hand end of the machine.

Briefly, the machine comprises a frame 1, having rails 3, arranged longitudinally of the frame, the upper portions of which form individual racks 2, and a carriage 4 mounted on rails 3 and adapted to be moved along the same by rotation of pinions 5 which engage the teeth of racks 2. The carriage is provided with a pair of stop fingers 6 and 7 adapted to engage alternately successive stops 8, 9, 10, 11 adjustably positioned upon index bars 23 and 24 which are mounted on the machine frame parallel with racks 2 and rails 3. Fingers 6 and 7 are mounted to slide transversely of the carriage and upon a shock absorbing mechanism having positively limited movement. At one end, the carriage is provided with a clamp 12 for gripping the stock (not shown) which is to be fed to the punch press (not shown) and the frame is provided with vertically adjustable rollers 13 for the stock to ride upon.

It will be understood that the punch press, to which my machine feeds the stock, will be positioned at the left hand end of Figure 1 and the machine frame may be continued to the right as far as is desired for each installation. The carriage 4 travels the full length of the frame and is here shown rather near the end of its travel toward the punch press. Its pinions 5 are rotated by means of a wheel 14 having hand grips 15 or by a motor drive hereafter described.

The carriage has a bolster 16 which mounts an air cylinder 17, the piston rod 18 of which extends to the left and there presses against a yoke 19. Yoke 19 is carried upon supports 20 which are slidably journaled in the frame of cylinder 17. The yoke is provided with alined, spaced, cylindrical bearings 21 (Fig. 2) the common axis of which extends transversely of the machine. A shift rod 22 is slidably mounted in bearing 21, extends beyond the side of the machine to a point adjacent hand wheel 14 and is there provided with a handle 22$^a$. Stop fingers 6 and 7 are fixed on shaft 22 and may be positioned thereby to engage stops 8, 9, 10, 11. When finger 6 or 7 encounters one of the stop elements, yoke 19 is thrust to the right against the resistance of the air and spring pressure in cylinder 17 until the yoke engages a cross beam 29.

The carriage is thereby halted until the engaged finger is released by shifting rod 22. When the stop finger is released from engagement with the stop element, spring 39 moves the cylinder piston to the left, pumping air into the cylinder and thrusting yoke 19 forward into extended position. Where the distance between successive punchings is short, the cylinder piston and the yoke may not be fully extended before the next stop is engaged but this will not be objectionable as there will be less momentum of the carriage and plate to be absorbed.

The index bars 23 and 24 are slightly spaced from each other and their upper faces are notched at regular intervals preferably not less than at one half inch, in order that the projections will not be unduly weakened. Adjustable stops 8, 9, 10, 11 are notched on their lower faces to fit on bars 23 and 24 and may be secured at any desired point along the index bars by individual T bolts 26. Each stop element rests upon and engages both index bars, and the head of each T bolt likewise engages both bars. It is obvious that a number of stop elements so secured throughout the length of bars 23 and 24 will form a rigid unit which may be assembled independently of the spacing machine and secured to the machine frame by machine screws 25. Thus, by providing a plurality of index bars, a set of index bars with stops for one job may be made ready while the machine is being operated on another job and various assemblies of stops and index bars may be kept for use if each assembly is used often enough to justify the cost and storage of the extra parts.

Each stop element projects upwardly beyond the horizontal plane marking the lower extension of stop fingers 6 and 7 and the latter are so spaced from each other that when one is withdrawn from stop engaging position the other will be moved into stop engaging position. This is shown in Figs. 1 and 2 in which stop finger 7 is positioned immediately above index bar 24 so as to engage stops 8 or 10 which have their stop faces positioned over index bar 24. If slide rod 22 is pulled to the right, finger 6 will be positioned immediately above bar 23 as finger 7 moves out of stop engaging position and finger 6 will engage stops 9 or 11 which are turned with their stop faces positioned over index bar 23.

Yoke 19 is provided with buffer lugs 27 adapted to support the finger stops 6 and 7 so that any shock occasioned by the engagement of the stops will be transmitted to the yoke direct instead of through the bearings 21 for slide rod 22. When one of fingers 6 or 7 engage a stop, and the cylinder piston is forced to the right, the air in cylinder 17 is expelled through an adjustable exhaust 38. The cylinder piston has a travel of about 2½ inches in its cylinder during which travel the concussion shock is gradually absorbed. By means of exhaust 38 the resistance to the travel of the piston may be regulated according to the nature of the power which drives the carriage and the average or maximum distance between successive stops, both of which elements will affect the momentum of the carriage.

The handle 22$^a$ on slide rod 22 has a limited loose movement thereon by which the operator may produce a hammer like blow in either direction, thereby facilitating the dislodgment of the engaged finger from the stop. It is necessary that pressure be exerted by the carriage drive to maintain the advanced position of the carriage against the tendency of spring 39 to move the cylinder and carriage rearwardly. This pressure will, of course, produce friction between the stop finger and the engaged stop which the lost motion handle easily overcomes.

To avoid undue sliding contact of fingers 6 and 7 on lugs 27, the contacting faces of these elements are beveled as indicated in Figure 11. This construction provides that the early transverse movement of finger 7 will free its entire beveled surface from the adjacent surface of lug 27 and eliminates friction between these elements during shifting of rod 22. It will be understood that the early movement of the carriage along the frame will not be rapid enough to maintain contact between the separating beveled surfaces. Other means will be described later which further insures that the carriage movement will not take place too quickly.

Each stop element is preferably tapped longitudinally of the frame and a threaded pin 28, provided with an angular socket, may be screwed therein by a tool which fits in the pin socket. Each pin provides its stop element with an adjustable stopping face which may be set at any point between successive index bar teeth either to insure accuracy in spacing or secure a spacing which is not a multiple of the rack teeth pitch. If the rack teeth are one-half inch pitch, which I consider a minimum for strength requirements, any space between stops which is not a multiple of one-half inch, such as three and one-eighth inches, may be provided by use of pins 28.

While pins 28 may also be used to provide spacing less than one and one-half inches, the minimum thickness of stop elements, it will be more convenient to provide and use the sub-divider detailed in Figure 5, which is mounted upon cross beam 29. This sub-divider operates to provide an adjustable buffing face for yoke 19 on cross beam 29. This is done by securing a track 31 upon cross beam 29 inclined at an angle to the forward edge thereof. The sub-divider 30 slides upon this track and when moved towards the operator will project its forward face beyond the front of the cross beam and thereby subtract the amount of this projection from the spacing provided by the stop elements 8, 9, 10, 11. Sub-divider 30 is held at different points upon this inclined track by a notched bar 32, which engages a notched catch 33 at the end of the cross beam. The notches in bar 32 are so spaced that successive notches are engaged upon each one-sixteenth inch projection of sub-divider 30 beyond cross beam 29. When a spacing less than one and one-half inches is to be used, the operator will be notified and will set bar 32 accordingly. Spacing less than one and one-half inches will be required so seldom that the special attention required to operate the sub-divider will not detract from the efficiency of the machine. Obviously, a screw or other indexing means may be substituted for bar 32 and catch 33.

To prevent unintentional continued functioning of sub-divider 30, I provide a slide rod lock 34 which engages a groove 35 in the slide rod 22 whenever the teeth of bar 32 are seated in catch 33. In order to release slide rod 22 so that finger 6 or 7 may be released and the carriage may advance to the next stop, it is necessary to release lock 34 and this is done automatically by moving bar 32 to the left to disengage catch 33 (Fig. 6). A spring 36 exerts a constant pull on sub-divider 30 and bar 32 and when the bar is retracted to the position shown by full lines in Figure 5, the straight edge 37 at the outer end of bar 32 rests upon the points of the teeth of the latch 33 and holds lock 34 disengaged from slide rod 22.

Feed racks 2 and rails 3 are integrally formed on an inverted V section and the carriage wheels 40 are also V-shaped and the inclined surfaces of the wheels ride on the inclined surfaces of the rails and racks so as to prevent lateral movement of the carriage on the frame. This eliminates any wearing of the carriage on the frame and prevents a discrepancy in the positioning of the stock in the punch press.

The carriage driving mechanism is shown in Figs. 1 and 9. A motor 41 is mounted on bolster 16 and its shaft 42 is coupled to a worm 43, which drives the gear 44. The latter rotates on a shaft 45, which is journaled on carriage 4. Gear 44 may be engaged with shaft 45 by means of a friction clutch including a clutch element 46. Pinions 47 fixed on shaft 45 mesh with pinions 5 and through the latter, and racks 2, advance the carriage on rails 3.

The clutch is shifted by a lever 48, a rod 49 and a lever 50, the handle of which is adjacent the operator. When the operator pushes the handle of lever 50 inwardly, the clutch is thrown out and worm gear 44 rotates freely on shaft 45. Lever 50 may be held in this position by a latch 51, pivoted on the carriage frame. When the clutch is disengaged, the carriage may be moved by means of wheel 14. Obviously, the machine may be operated solely by hand wheel 14, although the latter will generally be used only for adjusting, emergencies, etc.

The clutch is adapted to permit slippage between the motor and carriage when the latter is positively stopped but the motor is run continuously, thus holding the carriage in advanced, stop engaging position and against the retracting tendencies of spring 39 and the collision of the carriage and the stop.

As mentioned above, I desire to completely release the carriage from the drive when stop fingers 6 and 7 are shifted. I accomplish this by connecting the inner end of rod 22 to a cam 52 by means of a lever 53 and a shaft 54. Lever 48 is pivoted at 55 near its lower end and a lateral arm 56 on the lever, carries a roller 57 adapted to be engaged by the finger 58 on cam 52 when the latter is rotated by rod 22 as the handle is operated to shift fingers 6 and 7.

While I have shown a preferred construction embodying two index bars and substantially two rows of stops, it is within the scope of my machine to construct and operate same with a single row of stops or with more than two rows. If a single row is used the slide rod mounting the stop finger would have to be withdrawn to disengage a given stop and permit the machine to advance and be re-advanced to engage the next stop. With a greater number of index bars than shown in the drawings a greater sub-division of spacing may be obtained and such construction might be advantageous in use with multiple punches on wide sheets, in which case it might be desirable to use two shift bars instead of one. This is a modification which would in no wise differ in the principles of operation from the two bar machine shown.

It is now customary in spacing machines, where large quantities of plates or shapes are to be punched, to provide plain stop bars with simple stops permanently pinned or otherwise fixed thereon in proper positions, and it is obvious that such bars and stops may be substituted for the adjustable stops and bars I have shown without interfering with the other constructions of my machine or with the functioning of the stop engaging and other mechanism.

I am aware that changes in the form and proportion and arrangement of parts of my invention may be made without departing from the spirit or sacrificing the advantages thereof and I therefore reserve the right to make all such changes as fairly fall within the scope of the following claims:

I claim:

1. In a spacing machine, inverted V-shaped rails, rack teeth formed thereon, spool shaped wheels which travel on said rails, a stock holding carriage mounted on said wheels, and pinions mounted on said carriage and engaging said rack teeth.

2. In a spacing machine, inverted V-shaped rails, rack teeth formed on the upper portions thereof, spool shaped wheels which travel on the inclined sides of said rails and teeth, a stock holding carriage mounted on said wheels, and rack engaging pinions mounted on said carriage.

3. In a spacing machine, a pair of spaced index bars having notched upper faces, a plurality of adjustable stop bars having complementary notched faces on said index bars, bolts securing said stop bars in spaced relation along said index bars, and a stop face on each stop bar arranged in staggered relation to the stop faces on adjacent stop bars.

4. In a spacing machine, a frame provided with an index bar, a plurality of stop elements adapted to be removably secured to said bar, a traveling carriage mounted on said frame, and a shiftable stop finger on said carriage adapted to be alternately shifted in opposite directions to engage successive stop elements by the alternate movement thereof.

5. In a spacing machine, a frame, a removable stop unit comprising a plurality of parallel index bars rigidly secured together by a plurality of stop elements adjustably clamped thereto, and means for securing said stop unit to said frame.

6. In a spacing machine, a frame and a stop unit including a plurality of index bars removably secured to each other in cooperative relation by spaced stop elements and adapted to be assembled independently and to be mounted on said frame.

7. In a spacing machine, a frame and a stop unit including a plurality of index bars and a plurality of stop elements, said bars and elements being removably secured to each other in cooperative relation, and adapted to be assembled independently and to be mounted on said frame.

8. In a spacing machine, a frame, a traveling carriage mounted on said frame and provided with a stop finger, a stop unit comprising a plurality of longitudinal index bars, a plurality of transverse stop elements, and bolts rigidly securing said index bars and said stop elements together, and means for securing said stop unit to said frame.

9. In a spacing machine, a frame, a traveling carriage mounted on said frame and provided with a stop engaging finger, a plurality of index bars, a plurality of stop elements adapted to be positioned and secured on said index bars independently of said frame, means for securing said bars and stops to each other in cooperative relation to form a rigid stop unit, and means for removably securing said bars to said frame.

10. In a spacing machine, a frame, a traveling carriage mounted thereon, a plurality of index bars, a plurality of stop elements adjustably mounted on said bars and presenting a plurality of rows of stop faces, means for forming a rigid unit of said bars and elements, and means for mounting said unit on said frame.

11. In a spacing machine, a frame, a stop element mounted on said frame, a pin adjustably mounted in said element and forming a stop face therefor, and a traveling carriage adapted to be engaged by said pin.

12. In a spacing machine, a frame, a traveling carriage, and stop elements mounted at spaced intervals along said frame and provided with adjustable stop faces adapted to engage said carriage.

13. In a spacing machine, a frame, a notched index bar thereon, a stop element on said bar having notches to cooperate with the notches of said bar to prevent movement of said element, a threaded pin screwed into said element transversely of the notches thereon, and a traveling carriage mounted on said frame and adapted to engage said element.

14. In a spacing machine, a plurality of stop elements spaced apart in staggered relation, a traveling carriage, a stop finger on said carriage adapted to engage said elements in succession and means for shifting said finger after each engagement with one of said elements.

15. In a spacing machine, a plurality of spaced stop elements, a traveling carriage, a shiftable stop finger on said carriage adapted to engage said elements, and a mounting for said finger comprising a slidable shaft and an operating handle for said shaft having a limited lost motion thereon.

16. In a spacing machine, stop elements arranged in parallel rows, a traveling carriage provided with a stop member adapted to be shifted transversely of said rows of stop elements to alternately engage elements in each row.

17. In a spacing machine, a frame, parallel rows of stop elements mounted thereon, a traveling carriage mounted on said frame and provided with stop fingers adapted to engage said elements and so spaced that only one of said fingers can engage an element at one time.

18. In a spacing machine, a frame, parallel rows of stop elements mounted thereon, a traveling carriage mounted on said frame and provided with stop fingers spaced transversely of said parallel rows a greater distance apart than the distance between said rows.

19. In a spacing machine, a frame, a traveling carriage mounted thereon, stop elements mounted on said frame and spaced longitudinally thereof, a rod slidable transversely of said carriage and a finger fixed on said rod and adapted to engage said elements successively.

20. In a spacing machine, a frame, a traveling carriage mounted thereon, stop elements mounted on said frame and spaced longitudinally thereof, a rod slidably transversely of said carriage, a finger fixed on said rod and adapted to engage said elements successively, and a buffer block on said carriage adapted to support said finger upon its engagement with said elements.

21. In a spacing machine, a frame, a traveling carriage mounted thereon, stop elements on said frame, a stop engaging member on said carriage shiftable to disengage said elements, a member supporting lug, the contacting surfaces of said member and lug being bevelled to avoid sliding contact during shifting of said member.

22. In a spacing machine, a frame, a carriage mounted to travel longitudinally thereof, a stop element on said frame, a stop engaging member mounted on said carriage to slide transversely of said frame to disengage said stop element, a member supporting lug, the contacting surfaces of said lug and said member being similarly bevelled diagonally of the path of movement of said member.

23. In a spacing machine, a frame, a traveling carriage mounted thereon, stop elements on said frame, parallel members on said carriage shiftable transversely thereof to alternately engage said elements, lugs for alternately supporting said stop engaging members, the lug contacting faces of said members being oppositely bevelled outwardly and rearwardly, and the member contacting faces of said lugs being similarly oppositely bevelled.

24. In a spacing machine, a frame, a traveling carriage mounted thereon, a member for stopping the travel of said carriage, and yielding buffer means on said carriage adapted to engage said member.

25. In a spacing machine, a frame, a traveling carriage mounted thereon, means for stopping the travel of said carriage, a fluid pressure cylinder mounted on said carriage, and a piston therein adapted to engage said means.

26. In a spacing machine, a frame, a traveling carriage mounted thereon, an element on said frame for stopping the travel of said carriage and yielding buffer means on said carriage adapted to engage said element, said means including a spring and a slidable element telescopingly mounted on said carriage and adapted to be yieldingly held in projected position by said spring to engage said elements.

27. In a spacing machine, a frame, a traveling carriage mounted thereon, an element on said frame for stopping the travel of said carriage and a yielding buffer on said carriage adapted to engage said element and be moved relative to said carriage to absorb the stopping shock, and means for returning said buffer to normal position upon its release from said element.

28. In a spacing machine, a frame, a traveling carriage mounted thereon, an element on said frame for stopping the travel of said carriage and a buffing mechanism on said carriage adapted to engage said element and be moved relative to said carriage to absorb the stopping shock; said mechanism including a fluid pressure cylinder and a piston telescoping therewith to absorb the shock, and a spring adapted to return said piston to advanced position upon release of said carriage from said stopping element.

29. In a spacing machine, a frame, a traveling carriage mounted thereon, an element for stopping the travel of said carriage, and adjustable yielding buffer means on said carriage adapted to engage said element, said means including a fluid pressure cylinder, a piston mounted thereon, and an adjustable vent in said cylinder.

30. In a spacing machine, a frame, a traveling carriage mounted thereon, an element for stopping the travel of said carriage, and yielding buffer means on said carriage adapted to engage said element, said means including a yoke provided with a member adapted to engage said element, yoke supporting rods slidably mounted upon said bolster, a piston having a rod engaging said yoke, and a fluid pressure cylinder carried on said bolster and receiving said piston.

31. In a spacing machine, a plurality of spaced stop elements, a traveling carriage, a shiftable stop finger on said carriage adapted to engage said elements, means for advancing said carriage and holding same in tight engagement with said elements, and mechanism actuated by said finger, when shifted, for rendering said means inoperative temporarily.

32. In a spacing machine, a frame, a carriage, stop elements on said frame, stop fingers on said carriage adapted to alternately engage said elements, a member movable on said carriage to shift said fingers, means for advancing said carriage on said frame and for holding said carriage in advanced position against returning forces, said member when moved as described, being adapted to temporarily render said means inoperative.

33. In a spacing machine, a frame, a traveling carriage mounted thereon, cooperating stop elements on said frame and carriage for determining the successive advances of said carriage on said frame, and a sub-divider on said cariage for limiting the advance of said carriage to a lesser distance than provided by said stop elements.

34. In a spacing machine, a frame, a carriage mounted to travel longitudinally thereon, a plurality of stop elements on said frame, a stop engaging member mounted to slide longitudinally on said carriage, and means on said carriage for varying the sliding movement of said member when one of said elements is engaged thereby.

35. In a spacing machine, a frame, a traveling carriage mounted thereon, a plurality of stop elements on said frame, a stop engaging member mounted to slide longitudinally of said carriage to absorb the stopping shock, and means for varying the shock absorbing travel of said member comprising a track inclined transversely of said carriage, and a buffer block mounted to slide on said track to limit the longitudinal travel of said member.

36. In a spacing machine, a frame, a traveling carriage mounted thereon, stop elements on said frame and stop fingers on said carriage adapted to be shifted to engage said elements alternately, a finger shift rod, a friction drive for said carriage and means actuated by said rod to temporarily release said drive when said rod is operated to shift said fingers.

37. In a spacing machine, a frame, a traveling carriage mounted thereon, a plurality of stop elements on said frame, a telescoping stop engaging member on said carriage, and a buffer block for said member mounted upon an inclined track on said carriage positioned transversely of the line of travel of said carriage, and means for positioning said block along said track at predetermined intervals to secure variations in the telescoping movement of said member at corresponding predetermined intervals.

38. In a spacing machine, a frame, spaced stop elements thereon, a traveling carriage provided with a member adapted to engage said elements, a buffer for said member having normal and abnormal operative positions, and means whereby said member is locked in stop engaging position when said buffer is in abnormal position.

GEORGE P. KLINE.